United States Patent
Nakanishi et al.

(10) Patent No.: US 8,330,747 B2
(45) Date of Patent: Dec. 11, 2012

(54) DISPLAY DEVICE INCLUDING PHOTOSENSORS FOR DETECTING AMBIENT LIGHT AND DARK CURRENT FOR ADJUSTING A BACKLIGHT, AND DISPLAY CONTROL METHOD THEREOF

(75) Inventors: Takayuki Nakanishi, Kanagawa (JP); Yoshiharu Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 12/598,540

(22) PCT Filed: Oct. 27, 2008

(86) PCT No.: PCT/JP2008/069472
§ 371 (c)(1),
(2), (4) Date: Nov. 2, 2009

(87) PCT Pub. No.: WO2009/057561
PCT Pub. Date: May 7, 2009

(65) Prior Publication Data
US 2010/0141623 A1 Jun. 10, 2010

(30) Foreign Application Priority Data

Nov. 2, 2007 (JP) ................. 2007-286443
Aug. 29, 2008 (JP) ................. 2008-220699

(51) Int. Cl.
*G06F 3/038* (2006.01)
*G09G 5/00* (2006.01)
(52) U.S. Cl. ....................... 345/207; 345/102
(58) Field of Classification Search .......... 345/207, 345/102
See application file for complete search history.

(56) References Cited

U.S. PATENT DOCUMENTS

| 2004/0032676 | A1 | 2/2004 | Drummond et al. |
| 2005/0218302 | A1* | 10/2005 | Shin et al. .................. 250/214 R |
| 2008/0079860 | A1* | 4/2008 | Kunimori et al. ............... 349/43 |

(Continued)

FOREIGN PATENT DOCUMENTS

JP 2005-345286 12/2005

(Continued)

OTHER PUBLICATIONS

European Search Report issued Mar. 3, 2011, corresponding to European Appln. No. 08845145.5.

(Continued)

*Primary Examiner* — Chanh Nguyen
*Assistant Examiner* — Long D Pham
(74) *Attorney, Agent, or Firm* — K&L Gates LLP

(57) ABSTRACT

A display device is provided and includes a first photosensor that detects the light amount of ambient light of a display area, a second photosensor that detects dark current arising when light is blocked, and changeover switches that select the first photosensor and the second photosensor. The display device further includes a comparator that compares the output of the selected first photosensor or second photosensor with a predetermined reference value, and control means that calculates the difference between the comparison result by the comparator with the first photosensor and the comparison result by the comparator with the second photosensor and controls the amount of light supplied to the display area corresponding to the calculation result. This configuration suppresses the influence of a detection error due to variation in the performance between the photosensors applied to the display device to thereby accurately adjust the amount of light supplied to the display area.

8 Claims, 18 Drawing Sheets

U.S. PATENT DOCUMENTS

2008/0094347 A1* 4/2008 Lee et al. .................. 345/102
2009/0066897 A1 3/2009 Katoh et al.

FOREIGN PATENT DOCUMENTS

| JP | 2007-065004 | 3/2007 |
|----|-------------|--------|
| WO | 2006/117956 | 11/2006 |

OTHER PUBLICATIONS

Communication issued Mar. 10, 2011, corresponding to European Appln. No. 08845145.5.
International Search Report dated Nov. 17, 2008, for corresponding Patent Application PCT/JP2008/069472.

* cited by examiner

F I G . 6
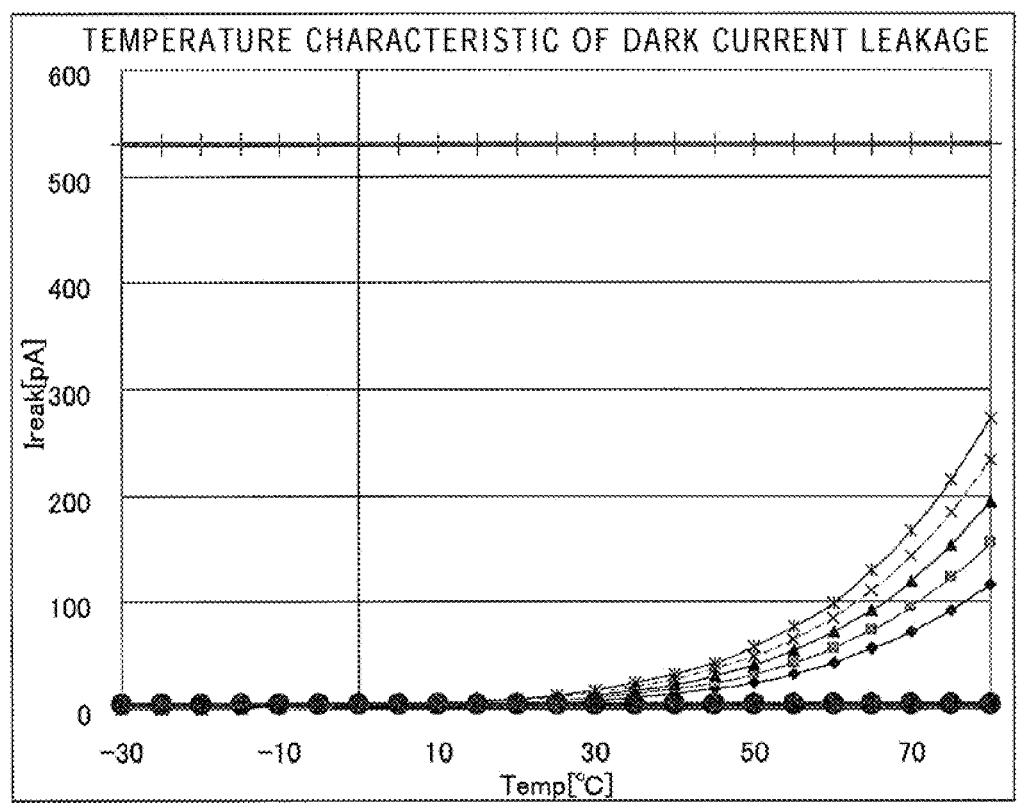

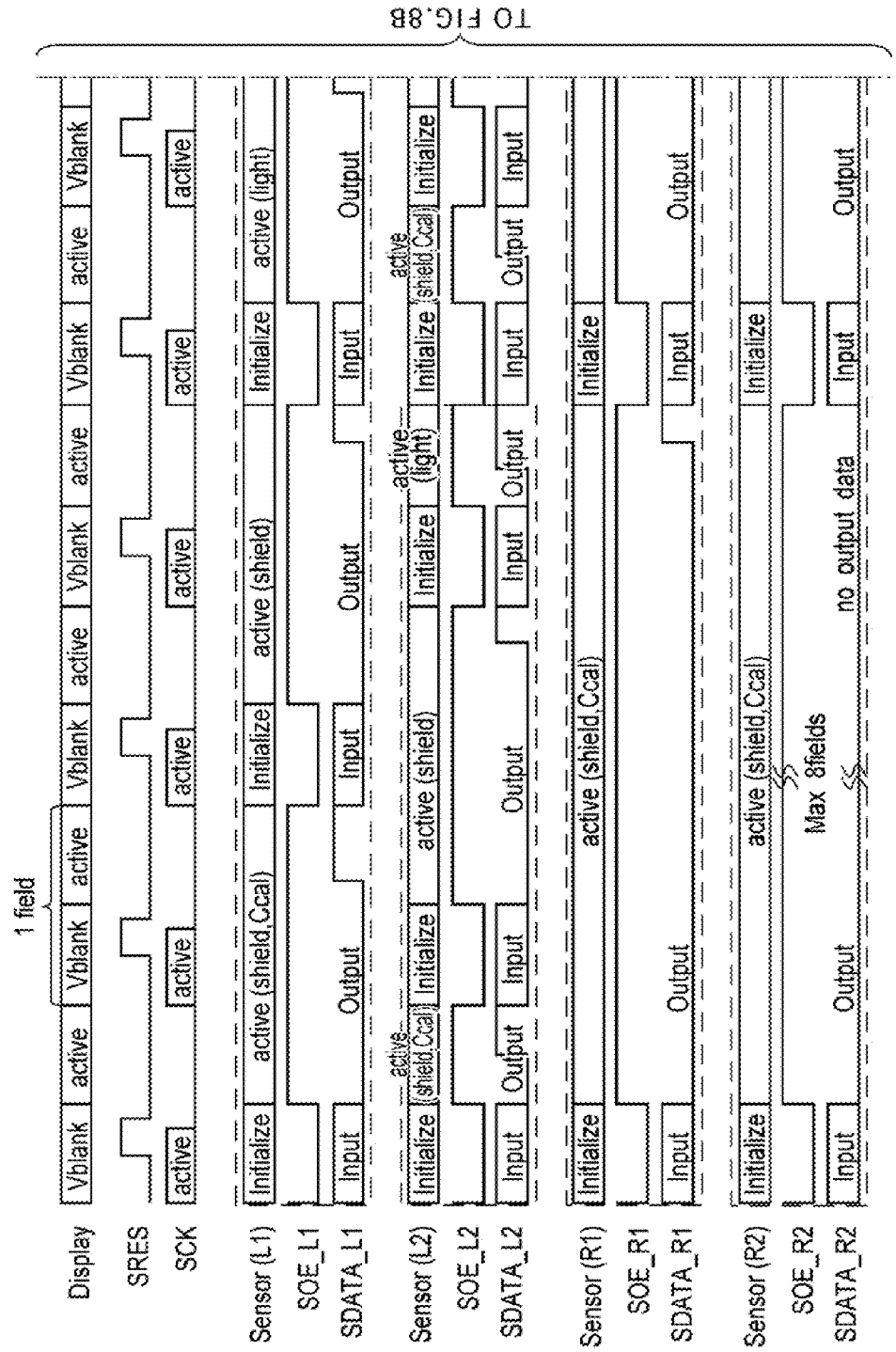

DISPLAY DEVICE INCLUDING PHOTOSENSORS FOR DETECTING AMBIENT LIGHT AND DARK CURRENT FOR ADJUSTING A BACKLIGHT, AND DISPLAY CONTROL METHOD THEREOF

CROSS REFERENCE TO RELATED APPLICATIONS

The present application is a National Stage of International Application No. PCT/JP2008/069472 filed on Oct. 27, 2008 and which claims priority to Japanese Patent Application No. 2007-286443 filed on Nov. 2, 2007 and Japanese Patent Application No. 2008-220699 filed on Aug. 29, 2008, the entire contents of which are being incorporated herein by reference.

BACKGROUND

The present disclosure relates to a display device that displays predetermined video, a display control method for controlling the display device, and electronic apparatus employing a display device.

Conventionally, as a photosensor used for dimming control of a liquid crystal display device, the following ones are used. Specifically, in a liquid crystal display device employing an amorphous silicon TFT, as shown in FIG. 21, a constant current circuit is connected to the sensor output and photocurrent is detected through conversion of current into voltage.

Furthermore, in the case of low-temperature poly-silicon (hereinafter, referred to as "LTPS"), a circuit can be formed on a substrate and thus a circuit configuration in which a comparator is connected to the sensor output as shown in FIGS. 22 and 23 is also possible. This circuit configuration allows a smaller circuit area and therefore the photosensor can be disposed in the periphery of a pixel.

However, applying a photosensor to a display device employing LTPS involves the following problems.

Problem (a) . . . the leakage amount (dark current) of the photosensor (transistor) is larger than that with single-crystal silicon.

Problem (b) . . . the light leakage amount (light current) of the photosensor is small.

Problem (c) . . . variation (individual difference) in the performance of elements such as the photosensor and the comparator is large in the same liquid crystal display device (panel).

Problem (d) . . . the dark current of the photosensor changes depending on the temperature.

Unless these factors are solved, it is difficult to fabricate a photosensor with high accuracy in a liquid crystal display device employing LTPS.

SUMMARY

In one embodiment, a display device includes a first detection element that detects the light amount of outside light, a second detection element that detects dark current arising when light is blocked, selection means for selecting either one of the first detection element and the second detection element, a comparator that compares the output of the first detection element or the second detection element selected by the selection means with a predetermined reference value, and control means for calculating the difference between a first comparison result obtained by the comparator when the first detection element is selected by the selection means and a second comparison result obtained by the comparator when the second detection element is selected, and controlling the amount of light supplied to the display area depending on the calculation result.

In this embodiment, the comparison between the output of the first detection element for detecting the light amount of outside light and the predetermined reference value and the comparison between the output of the second detection element for detecting dark current arising when light is blocked and the predetermined reference value are carried out by one comparator. This allows elimination of the influence of variation in the performance of the comparator.

In the embodiment, two comparison results are obtained by one comparator. These two comparison results can be obtained in a time-division manner through selection of the first detection element or the second detection element by the selection means.

Furthermore, by switching between the predetermined reference value used when the output of the first detection element is compared by the comparator and the predetermined reference value used when the output of the second detection element is compared by the comparator, an error of the calculation result due to variation in the performance between both the detection elements can be suppressed.

In addition, by switching of additional capacitance connected in common to both the detection means between when the first detection element is selected by the selection means and when the second detection element is selected, the detection times of both the detection elements in the detection of the light amount of outside light and the detection of dark current can be adjusted.

The detection element in the present invention is an element capable of outputting the current dependent on the light-reception amount. Examples thereof include one having a diode configuration and one having a transistor configuration.

Furthermore, the present embodiment is a display control method of a display device including a first detection element that detects the light amount of outside light and a second detection element that detects dark current arising when light is blocked. The method includes the steps of detecting dark current arising when light is blocked by the second detection element and calculating a comparison value obtained when light is blocked through comparison with a predetermined reference value, detecting current dependent on the ambient light amount by the first detection element and calculating a comparison result obtained when light is received through comparison with a predetermined reference value, and calculating the difference between the comparison result obtained when light is received and the comparison result obtained when light is blocked, and controlling the amount of light supplied to the display area depending on the calculation result.

In this embodiment, in the comparison between the output of the first detection element for detecting the light amount of outside light and the predetermined reference value and the comparison between the output of the second detection element for detecting dark current arising when light is blocked and the predetermined reference value by use of one comparator, switching between the comparison with the first detection element and the comparison with the second detection element is carried out. This allows elimination of the influence of variation in the performance of the comparator.

Furthermore, the present embodiment is an electronic apparatus including a display device provided in a case. In the electronic apparatus, the display device includes a first detection element that detects the light amount of outside light, a second detection element that detects dark current arising when light is blocked, selection means for selecting either one of the first detection element and the second detection element, a comparator that compares the output of the first detection element or the second detection element selected by the selection means with a predetermined reference value, and control means for calculating the difference between a first comparison result obtained by the comparator when the first detection element is selected by the selection means and a second comparison result obtained by the comparator when the second detection element is selected, and controlling the amount of light supplied to the display area depending on the calculation result.

In this embodiment, the comparison between the output of the first detection element for detecting the light amount of outside light and the predetermined reference value and the comparison between the output of the second detection element for detecting dark current arising when light is blocked and the predetermined reference value are carried out by one comparator. This allows elimination of the influence of variation in the performance of the comparator, and thus allows highly-accurate control of the amount of light supplied to the display area.

Additional features and advantages are described herein, and will be apparent from, the following Detailed Description and the figures.

BRIEF DESCRIPTION OF THE FIGURES

FIG. 6 is a diagram showing the temperature characteristic of dark current.

FIG. 8A is a diagram showing the timings of image displaying on a display area and detection by photosensors.

DETAILED DESCRIPTION

Embodiments will be described below based on the drawings.

<Outline of Display Device>

Figure 1:
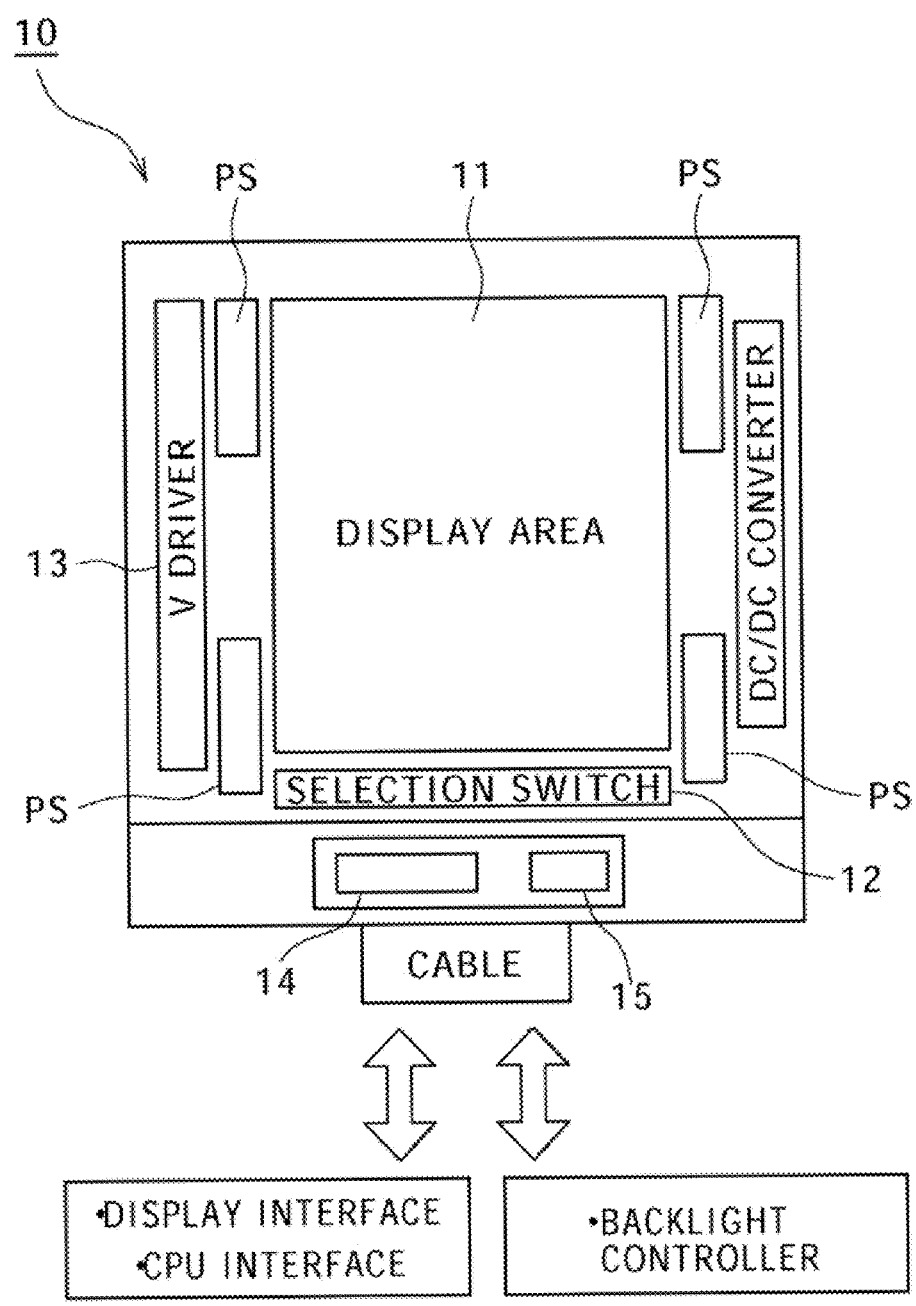
FIG. 1 is a schematic configuration diagram of a display device according to an embodiment.

FIG. 1 is a schematic configuration diagram of a display device according to the present embodiment. Specifically, a display panel 10 as the display device of the present embodiment includes a display area (sensor area) 11, a selection switch 12 that carries out scanning along the H (horizontal) direction for displaying, a V driver 13 that carries out scanning along the V (vertical) direction for displaying, a display driver 14, a sensor driver 15, and plural photosensors PS.

The display area (sensor area) 11 modulates light from a backlight, which is not shown in the drawing, and outputs display light. The plural photosensors PS are disposed in the periphery of the display area 11 and are driven by the sensor driver 15. The display driver 14 and the sensor driver 15 are collected into an integrated circuit and are mounted as a chip component on the substrate.

The selection switch 12 line-sequentially drives the liquid crystal elements of the respective pixels in the display area 11 together with the V driver 13, based on a display signal and a control clock for display driving, supplied from the display driver 14.

Around the display area 11, the plural photosensors PS are disposed. The photosensors PS are formed of a diode configuration or a transistor configuration and are formed on the same substrate as that of the drive elements formed in the display area 11 for example.

The display panel 10 is connected via a cable to external interfaces (e.g. a display interface, CPU interface) and a backlight control means and is driven based on a control signal and a video signal from these units.

Although four photosensors PS are provided corresponding to the corners of the display area 11 in the example shown in FIG. 1, it is sufficient that at least two photosensors are provided. One of these two photosensors serves as a first photosensor that detects the light amount of outside light and the other serves as a second photosensor that detects dark current arising when light is blocked. In the present embodiment, the control unit (backlight control means) controls the light amount of the backlight based on the detection results by these photosensors.

Figure 2:
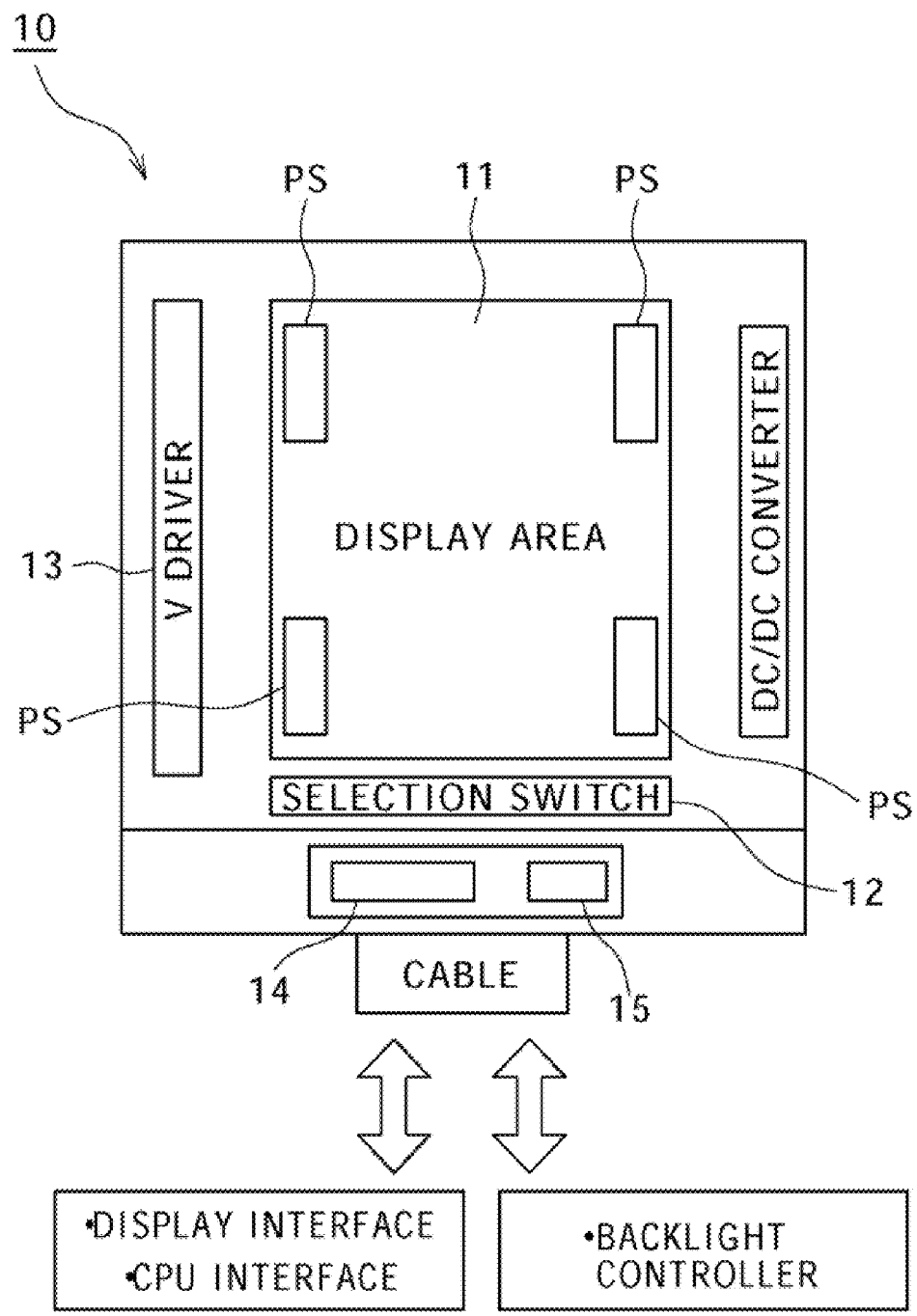
FIG. 2 is a schematic configuration diagram of another display device according to an embodiment.

FIG. 2 is a schematic configuration diagram of another display device according to the present embodiment. A display panel 10 as the display device shown in FIG. 2 is the same as the above-described display panel 10 shown in FIG. 1, except that the arrangement of the photosensors PS is different. Specifically, in the display panel 10 shown in FIG. 2, the photosensors PS are disposed in the display area 11, and the light amount of outside light is detected by the photosensors PS disposed in the display area 11.

Although four photosensors PS are provided in the display area 11 in the example shown in FIG. 2, it is sufficient that at least two photosensors are provided. Of these two photosensors, one photosensor PS is disposed in the display area 11, and the other photosensor PS is provided in the display area 11 or in the periphery of the display area 11.

The photosensor PS disposed in the display area 11 serves as the first photosensor that detects the light amount of outside light, and the other photosensor PS provided in the display area 11 or in the periphery of the display area 11 serves as the second photosensor that detects dark current arising when light is blocked. In the present embodiment, the control unit (backlight control means) controls the light amount of the backlight based on the detection results by these photosensors.

Specific application examples of two photosensors in the above-described display device will be described below.

First Embodiment

Configuration for Eliminating Influence of Individual Difference in Comparator Characteristics The present embodiment has the following circuit configuration. Specifically, based on a configuration that performs arithmetic operation for the outputs of the first photosensor that detects the light amount of outside light and the second photosensor that detects dark current arising when light is blocked as photosensors that are formed near the display area or in the display area on the same substrate, detection results are held by using the same comparator through switching between the first photosensor and the second photosensor, and the difference between these detection results is obtained by a difference calculation circuit.

Figure 22:
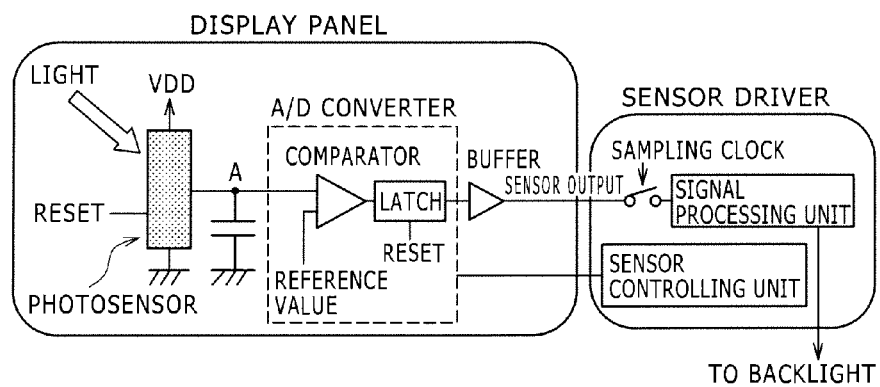
FIG. 22 is a diagram for explaining a conventional example (second).
Figure 23:
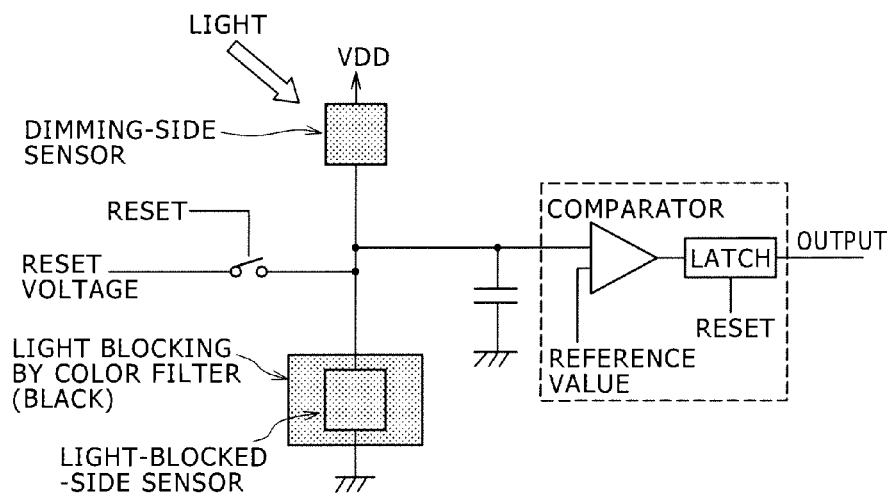
FIG. 23 is a diagram for explaining a conventional example (third).

In the conventional example shown in FIG. 23, dark current is automatically removed. However, removal of dark current on the output side is necessary when the method of FIG. 22 is used. In order to remove dark current, two photosensors are disposed and one sensor is shielded from light by a color filter (black) so as to be prevented from being irradiated with light. The output of the sensor shielded from light corresponds to only dark current, and therefore only light current can be worked out by calculating the difference from the output of the sensor irradiated with light.

However, obtaining the conventional structure with LTPS involves a problem that the individual difference of the comparator is large and thus difference arises in the output.

Figure 3:
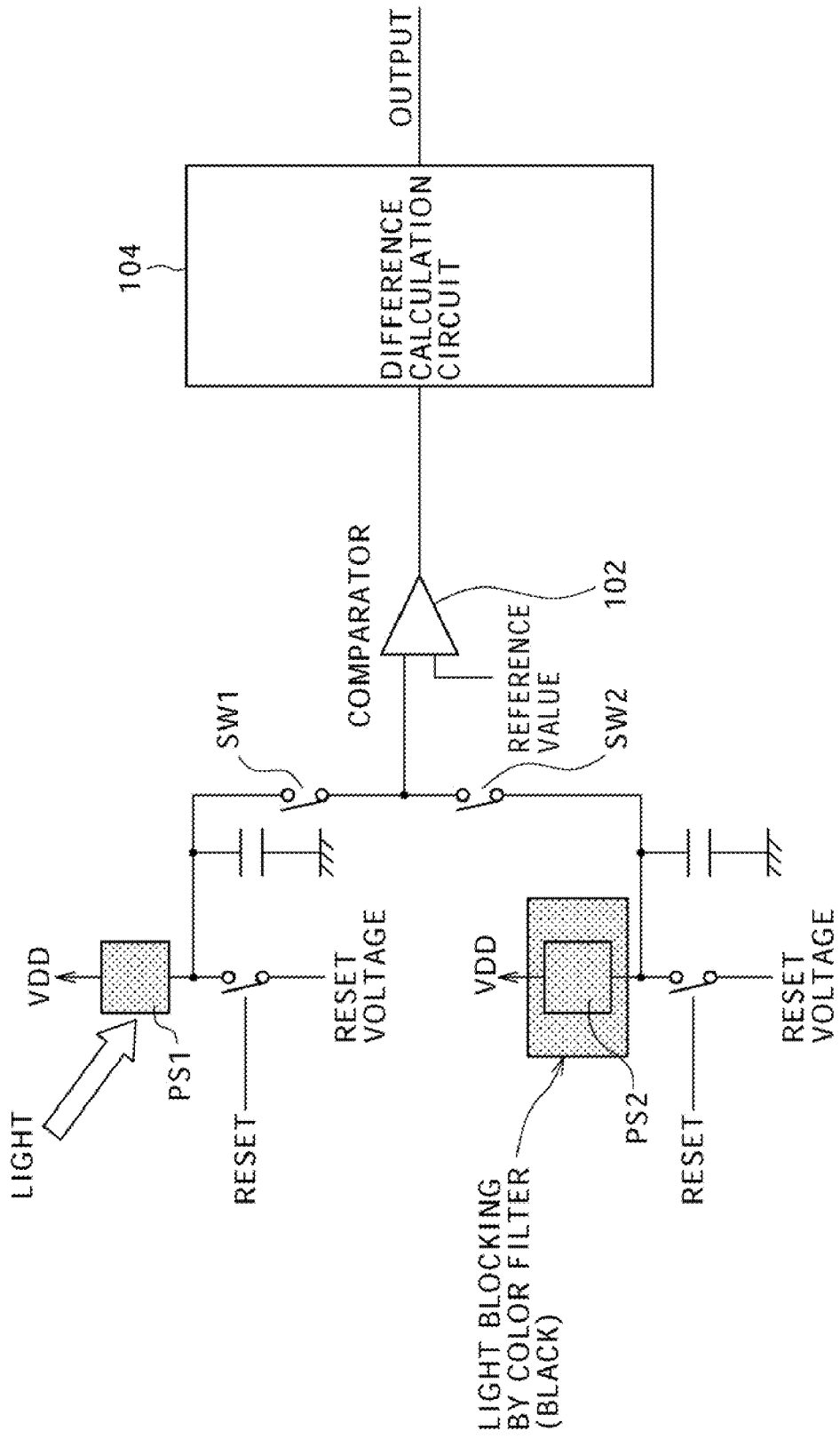
FIG. 3 is a circuit diagram for explaining major part of a display device according to a first embodiment.

To address this problem, in the present embodiment, as shown in FIG. 3, changeover switches SW1 and SW2 are attached to the outputs of photosensors PS1 and PS2 on the dimming side and the light-blocked side, respectively, and detection results are read out in a time-division manner by using the same comparator 102. This makes it possible to remove the error of the comparator 102 and achieve the effect of reduction in the circuit area.

<Display Control Method by Display Device According to First Embodiment>

As described above, the first photosensor PS1 that detects the light amount of outside light and the second photosensor PS2 that detects dark current arising when light is blocked are provided in the display device according to the present embodiment, and comparison between the detection results by these photosensors and predetermined reference values is carried out with one comparator 102 in this display device. For this purpose, switching between the first photosensor PS1 and the second photosensor PS2 is carried out, and the comparator 102 is operated in a time-division manner.

Initially, the changeover switch SW1 of the first photosensor PS1 is turned OFF, whereas the changeover switch SW2 of the second photosensor PS2 is turned ON. In this state, the reset of the second photosensor PS2 is turned ON/OFF one time and detection is started. This detection is equivalent to measurement of dark current arising when light is blocked because a black color filter is provided for the second photosensor PS2. The detection result is sent to one input of the comparator 102. To the other input of the comparator 102, the predetermined reference value used when the second photosensor PS2 is selected is input.

Subsequently, the time (e.g. the number of steps) from the detection start to the timing at which the detection value of the second photosensor PS2 surpasses the predetermined reference value is counted and stored in the memory of a difference calculation circuit 104.

Subsequently, the changeover switch SW2 of the second photosensor PS2 is turned OFF, whereas the changeover switch SW1 of the first photosensor PS1 is turned ON. In this state, the reset of the first photosensor PS1 is turned ON/OFF one time and detection is started. The first photosensor PS1 can receive ambient light, and thus this detection is equivalent to measurement of current arising at the time of light irradiation. The detection result is sent to one input of the comparator 102. To the other input of the comparator 102, the predetermined reference value used when the first photosensor PS1 is selected is input.

Subsequently, the time (e.g. the number of steps) from the detection start to the timing at which the detection value of the first photosensor PS1 surpasses the predetermined reference value is counted and stored in the memory of the difference calculation circuit 104.

Subsequently, the detection result by the first photosensor PS1 and the detection result by the second photosensor PS2, stored in the memory of the difference calculation circuit 104, are read out, and the difference calculation circuit 104 performs operation of subtracting the detection result by the second photosensor PS2 from the detection result by the first photosensor PS1. This allows achievement of the result arising from subtraction of the component corresponding to the dark current from the detection result obtained at the time of the light irradiation. Based on this calculation result, the light amount of the backlight emitted onto the display area 11 (see FIG. 1) is controlled by the backlight control means. For example, the light amount of the backlight is increased when the ambient light amount is larger, whereas the light amount of the backlight is decreased when the light amount of ambient light is smaller.

In this manner, the detection results about two photosensors PS1 and PS2 are compared by using one comparator 102 and calculation is performed with use of the values. Thus, the light amount detection can be accurately carried out without suffering from the influence of variation in the characteristics of the comparator 102.

Second Embodiment

Figure 4:
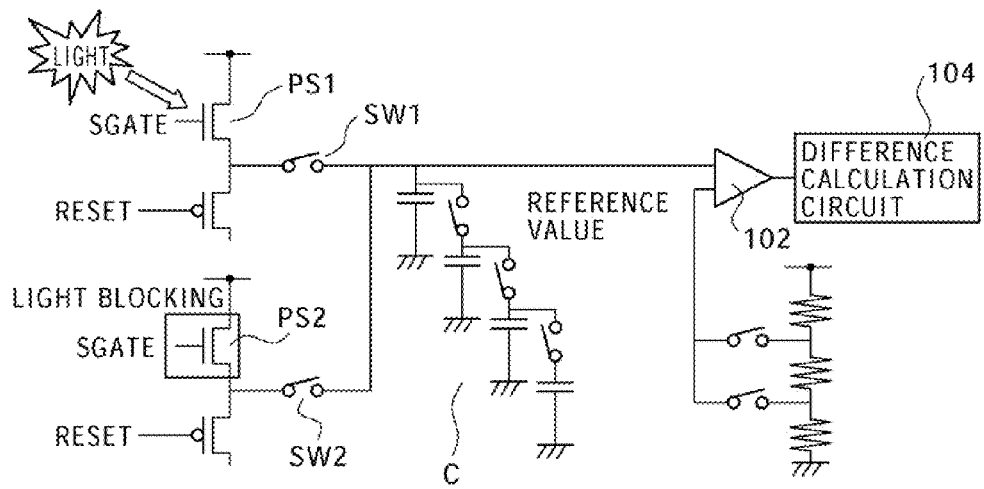
FIG. 4 is a circuit diagram for explaining major part of a display device according to a second embodiment.

Configuration for Eliminating Influence of Individual Difference in Photosensor Characteristics FIG. 4 is a circuit diagram for explaining major part of a display device according to a second embodiment. This display device is the same as the first embodiment (see FIG. 3) in that the display device includes the first photosensor PS1 that detects the light amount of outside light, the second photosensor PS2 that detects dark current arising when light is blocked, the changeover switches SW1 and SW2 for switching between the first photosensor PS1 and the second photosensor PS2, and the comparator 102. However, this display device is different from the first embodiment in that additional capacitance C connected to the output line common to the first photosensor PS1 and the second photosensor PS2 is variable and the reference value of the comparator 102 is variable.

The additional capacitance C in the display device of the present embodiment can be switched between when the first photosensor PS1 is selected and when the second photosensor PS2 is selected. Furthermore, the reference value of the comparator 102 in the display device of the present embodiment can also be switched between when the first photosensor PS1 is selected and when the second photosensor PS2 is selected.

In the light amount detection with the first photosensor PS1 and the second photosensor PS2, the existence of individual difference in the element characteristics between the first photosensor PS1 and the second photosensor PS2 causes the lowering of the accuracy of the outputs of the photosensors.

To address this problem, the present embodiment employs a configuration that can change the additional capacitance C and the reference value of the comparator 102 as described above, as a scheme for adjusting the element individual difference between the photosensors PS1 and PS2.

In such a configuration, the element individual variation between the photosensors PS1 and PS2 can be absorbed by performing initial calibration about the display device and feedback of the values thereof. For example, in the initial calibration (e.g. in calibration at the time of product shipping), the additional capacitance C or the reference value is so adjusted that the detection result obtained when dark current is detected by the first photosensor PS1 corresponds with the detection result obtained when dark current is detected by the second photosensor PS2.

Specifically, in the case of adjusting the additional capacitance C, initially the reference value of the comparator 102 is set to a constant value ref1 and dark current arising when certain additional capacitance C (referred to as C1, in this example) is employed is detected by the first photosensor PS1, and the comparison result by the comparator 102 is obtained.

Subsequently, with use of the reference value ref1 of the comparator 102 as with the previous detection, dark current is detected by the second photosensor PS2 and the comparison result by the comparator 102 is obtained. In this detection, the additional capacitance C is changed to determine the additional capacitance C (referred to as C2, in this example) that provides the comparison result corresponding with the comparison result previously detected with the first photosensor PS1.

Furthermore, in the case of adjusting the reference value, initially the additional capacitance C is fixed at C1 and the reference value of the comparator 102 is set to the constant value ref1. Subsequently, dark current is detected by the first photosensor PS1 and the comparison result by the comparator 102 is obtained. Subsequently, with use of the additional capacitance C1 as with the previous detection, dark current is detected by the second photosensor PS2 and the comparison result by the comparator 102 is obtained. In this detection, the reference value of the comparator 102 is changed to determine the reference value (referred to as ref2, in this example) that provides the comparison result corresponding with the comparison result previously detected with the first photosensor PS1.

Subsequently, the additional capacitance C1 or the reference value ref1 corresponding to the first photosensor PS1 and the additional capacitance C2 or the reference value ref2 corresponding to the second photosensor PS2 are stored, and these values are used in actual light amount measurement.

<Display Control Method by Display Device According to Second Embodiment>

As described above, the first photosensor PS1 that detects the light amount of outside light and the second photosensor PS2 that detects dark current arising when light is blocked are provided in the display device according to the present embodiment, and comparison between the detection results by these photosensors and predetermined reference values is carried out with one comparator 102 in this display device. For this purpose, switching between the first photosensor PS1 and the second photosensor PS2 is carried out by the changeover switches SW1 and SW2, and the comparator 102 is operated in a time-division manner. Furthermore, on the premise that the additional capacitance C1 or the reference value ref1 corresponding to the first photosensor PS1 and the additional capacitance C2 or the reference value ref2 corresponding to the second photosensor PS2 are stored in advance, measurement is performed with switching between these values.

Initially, the changeover switch SW1 of the first photosensor PS1 is turned OFF, whereas the changeover switch SW2 of the second photosensor PS2 is turned ON. Furthermore, the additional capacitance C2 or the reference value ref2, which is stored in advance and corresponds to the second photosensor PS2, is set. In this state, the reset of the second photosensor PS2 is turned ON/OFF one time and detection is started. This detection is equivalent to measurement of dark current arising when light is blocked because a black color filter is provided for the second photosensor PS2. The detection result is sent to one input of the comparator 102. To the other input of the comparator 102, the predetermined reference value ref2 used when the second photosensor PS2 is selected is input.

Subsequently, the time (e.g. the number of steps) from the detection start to the timing at which the detection value of the second photosensor surpasses the predetermined reference value ref2 is counted and stored in the memory of the difference calculation circuit 104.

Subsequently, the changeover switch SW2 of the second photosensor PS2 is turned OFF, whereas the changeover switch SW1 of the first photosensor PS1 is turned ON. Furthermore, the additional capacitance C1 or the reference value ref1, which is stored in advance and corresponds to the first photosensor PS1, is set. In this state, the reset of the first photosensor PS1 is turned ON/OFF one time and detection is started. The first photosensor PS1 can receive ambient light, and thus this detection is equivalent to measurement of current arising at the time of light irradiation. The detection result is sent to one input of the comparator 102. To the other input of the comparator 102, the predetermined reference value ref1 used when the first photosensor PS1 is selected is input.

Subsequently, the time (e.g. the number of steps) from the detection start to the timing at which the detection value of the first photosensor PS1 surpasses the predetermined reference value ref1 is counted and stored in the memory of the difference calculation circuit 104.

Subsequently, the detection result by the first photosensor PS1 and the detection result by the second photosensor PS2, stored in the memory of the difference calculation circuit 104, are read out, and the difference calculation circuit 104 (see FIG. 3) performs operation of subtracting the detection result by the second photosensor PS2 from the detection result by the first photosensor PS1. This allows achievement of the result arising from subtraction of the component corresponding to the dark current from the detection result obtained at the time of the light irradiation. Based on this calculation result, the light amount of the backlight emitted onto the display area 11 (see FIG. 1) is controlled by the backlight control means. For example, the light amount of the backlight is increased when the light amount of ambient light is larger, whereas the light amount of the backlight is decreased when the light amount of ambient light is smaller.

In this manner, detection is performed after the additional capacitance C1, C2 or the reference value ref1, ref2 is set for each of two photosensors PS1 and PS2, and the detection results are compared by one comparator 102. Thus, the light amount detection can be accurately carried out without suffering from the influence of characteristic variation between two photosensors PS1 and PS2 and variation in the characteristics of the comparator 102.

As a configuration to suppress characteristic variation between two photosensors PS1 and PS2, the following ones will be available besides the above-described configuration employing switching of the additional capacitance C or the reference value.

Figure 5:
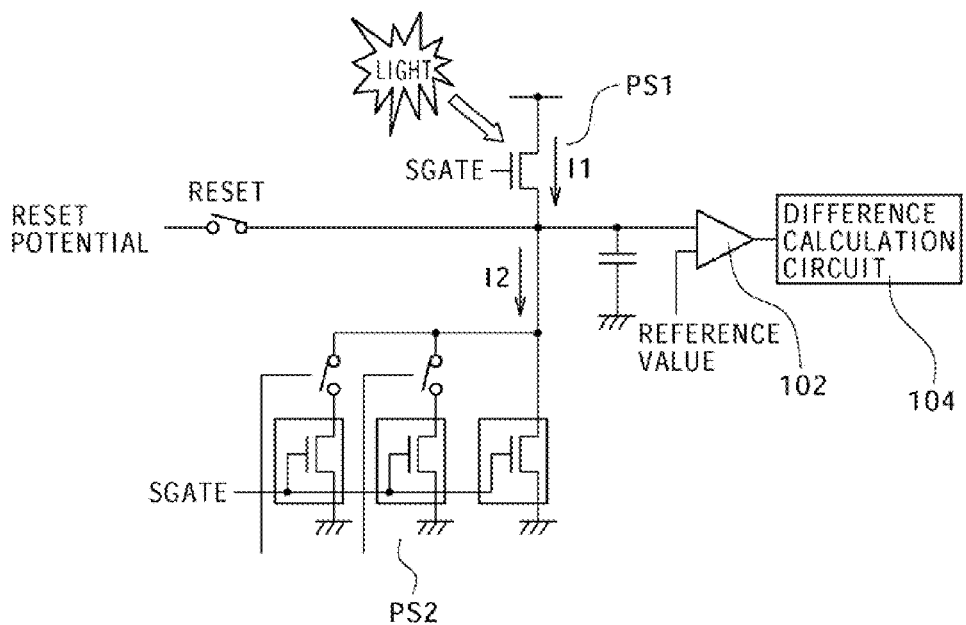
FIG. 5 is a circuit diagram showing a configuration capable of changing the element size of a second photosensor.

(1) a configuration that has a function to change the element size of two photosensors (or either one thereof) and includes a circuit capable of externally controlling the element size of these photosensors. FIG. 5 is a circuit diagram showing a configuration capable of changing the element size of the second photosensor. Plural second photosensors PS2 are provided in parallel, and how many photosensors among them are to be used can be selected by switches. This selection is determined in initial calibration in advance and is applied to detection of the light amount (dark current) with use of the second photosensor PS2. The selected element size may be a value recorded in a non-volatile memory in advance. Furthermore, fuses may be provided instead of the switches and the fuse may be burned off depending on the selected element size.

(2) a configuration that includes a photosensor formed on the same substrate as that of the display area and can change the supply voltage of the photosensor element depending on the element characteristics of the photosensor.

(3) a configuration that has a function to change the voltage supplied to the photosensor at the time of the reset of two photosensors (or either one thereof) and includes a circuit capable of externally controlling the voltage supplied to the photosensor. The voltage supplied at the time of the reset is obtained in initial calibration in advance and is applied to detection of the light amount (dark current) with use of the photosensor.

Third Embodiment

Configuration for Avoiding Lowering of Resolution Dependent on Temperature and Outside Light Illuminance The present embodiment is a scheme for avoiding the lowering of the resolution of the photosensor dependent on the temperature and the outside light illuminance with use of a display device having the configuration shown in FIGS. 4 and 5.

LTPS has a drastic temperature characteristic as the dark current (transistor leakage) characteristic as shown in FIG. 6. Therefore, in the case of a sensor circuit that charges the current flowing through the photosensor element in capacitance and outputs it as a time via the comparator in the configuration of the display device shown in FIGS. 4 and 5, the electric charges charged in the capacitance increase if dark current increases on the higher temperature side. This leads to a problem that the output time is shortened and thus the detection resolution is lowered.

To address this problem, in the present embodiment, the additional capacitance C that is used in the display device shown in FIGS. 4 and 5 and whose capacitance value can be selected from the external is utilized to avoid the lowering of the resolution of the photosensor dependent on the temperature and the ambient light illuminance.

Specifically, in the situation in which electric charges are rapidly accumulated in the additional capacitance C when the temperature is high or the illuminance is high and the resolution is lowered, the additional capacitance C is increased based on control from the external and thereby the time of the charging of electric charges in the additional capacitance C is extended, to thereby enhance the resolution of the photosensor. In contrast, when current is small due to a low temperature or low illuminance, the time of the charging of electric charges in the additional capacitance C is controlled by decreasing the additional capacitance C, so that the measurement time is shortened.

This switch control of the additional capacitance C is carried out in the initialization period previous to the above-described detection of dark current by the second photosensor PS2 and detection of the ambient light amount by the first photosensor PS1. Examples of the initialization period include the vertical blanking period in image displaying on the display area 11 (see FIG. 1).

<Display Control Method by Display Device According to Third Embodiment>

A specific display control method by the display device of the present embodiment will be described below. As described above, dark current of LTPS has a drastic temperature characteristic. Therefore, if, in the display device shown in FIG. 4, measurement is carried out by separately using the photosensor on the light-blocked measurement side (second photosensor PS2) and the photosensor on the light-irradiation measurement side (first photosensor PS1) and the difference between the outputs of the photosensors is calculated to thereby measure light current, the additional capacitance C is changed in order to ensure high resolution. However, the setting range of the additional capacitance C needs to be wide because change in dark current dependent on the temperature is large, and it is difficult to select the optimum capacitance.

To address this problem, in the present embodiment, the optimum additional capacitance C is selected by the following method, to thereby achieve display control.

Initially, measurement with the second photosensor PS2, which is on the light-blocked measurement side, is carried out with the same setting as that at the time of calibration and the measurement value is compared with the value obtained in the calibration. This allows measurement of change in dark current. Specifically, because dark current detection is performed under constant-temperature environment in the calibration, the detected value of dark current by the second photosensor PS2 can be converted into change in the dark current dependent on the temperature through comparison between the detected value by the second photosensor PS2 and the detected value at the time of the calibration.

Figure 7:
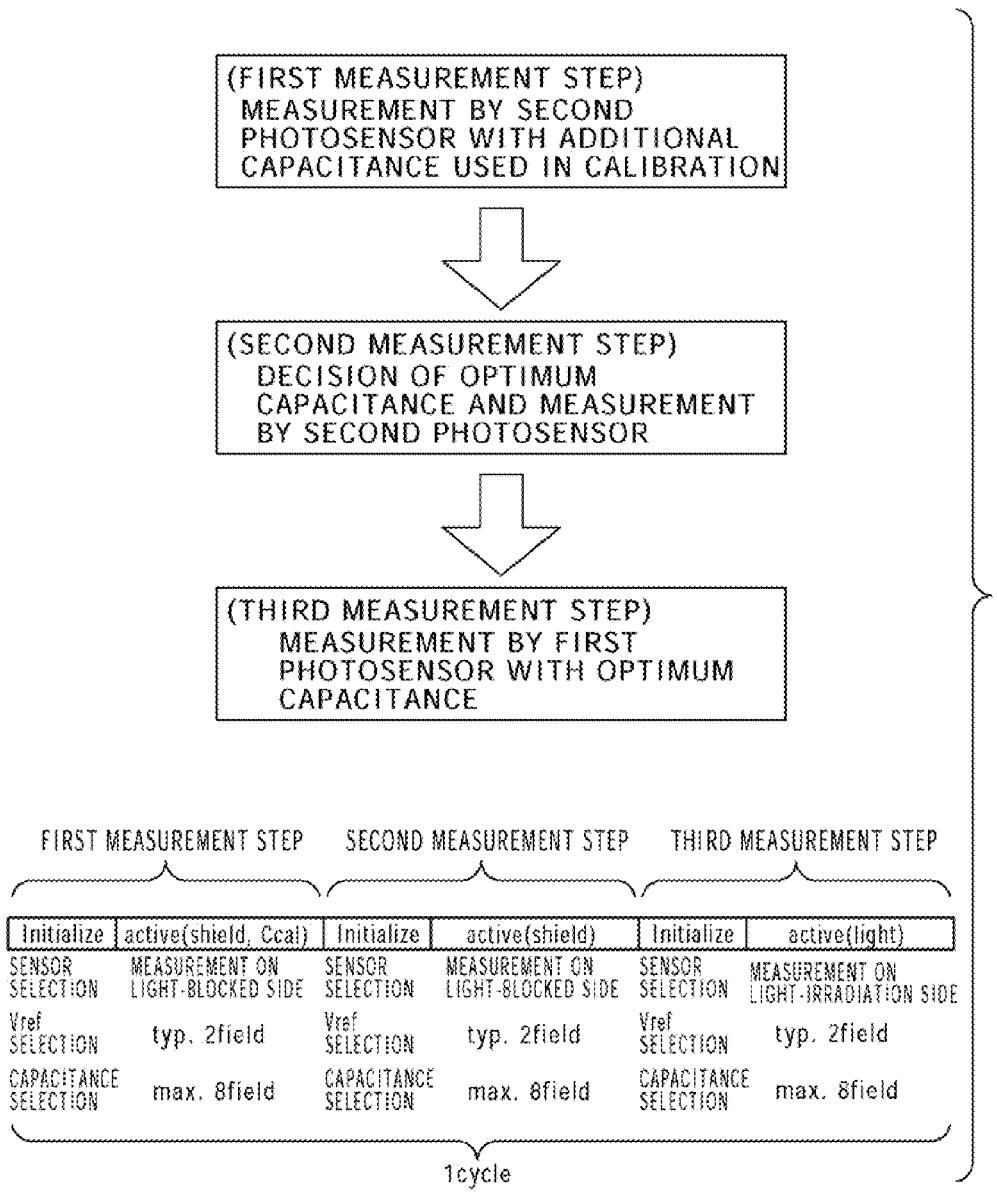
FIG. 7 is a diagram for explaining the flow of a display control method according to a third embodiment.

FIG. 7 is a diagram for explaining the flow of the display control method of the present embodiment, premised on this principle. At first, as initialization, selection of the second photosensor and selection of the comparator reference value and the additional capacitance used in the calibration are carried out. Thereafter, current arising when light is blocked is measured by the second photosensor (first measurement step).

Subsequently, as initialization, selection of the second photosensor and selection of the comparator reference value used in the calibration are carried out. In addition, from the ratio between the measurement result by the second photosensor in the first step and the measurement result at the time of the calibration, the dark current amount is estimated and the optimum capacitance is selected. Thereafter, current arising when light is blocked is measured by the second photosensor again (second measurement step).

Subsequently, as initialization, selection of the first photosensor, selection of the comparator reference value used in the calibration, and selection of the optimum capacitance are carried out. Thereafter, the ambient light amount is measured by the first photosensor (third measurement step). From this measurement result, the illuminance is worked out in accordance with the following calculation equation.

$$Lout = L0 \times SL \times Sbk / (Sbk - SL) / Sc$$

In this equation,

Lout: output illuminance [lx]

Sbk: comparator output value based on the dark current arising when light is blocked, measured by the second photosensor in the calibration [time (e.g. step)]

SL: comparator output value based on the current arising at the time of irradiation with light of certain illuminance L0 [lx], measured by the first photosensor in the calibration [time (e.g. step)]

Sc in the above equation is represented as follows.

$$Sc = St \times SRTbk / (Stbk - St)$$

In this equation,

St: comparator output value based on the current value obtained at the time of light irradiation, detected by the first photosensor in the actual measurement [time (e.g. step)]

Stbk: comparator output value based on the current value obtained when light is blocked, detected by the second photosensor in the actual measurement [time (e.g. step)]

SRTbk: comparator output value based on the current value obtained when light is blocked, detected by the second photosensor in the actual measurement with the same additional capacitance as that in the calibration [time (e.g. step)]

The illuminance calculation is continuously carried out in accordance with the above calculation equation in such a way that the above-described steps from the first measurement step to the third measurement step is defined as one cycle. This makes it possible to obtain the accurate illuminance with avoidance of the resolution lowering dependent on the temperature and the outside light illuminance.

In the display device of the present embodiment, the light amount of the backlight emitted onto the display area 11 (see FIG. 1) is controlled by the backlight control means with use of the illuminance obtained in the above-described embodiment. For example, the higher the obtained illuminance is, the larger the light amount of the backlight is set. In contrast, the lower the obtained illuminance is, the smaller the light amount of the backlight is set.

The illuminance calculation and the control of the light amount of the backlight in the present embodiment may be carried out independently of the timing of image displaying on the display area 11. However, it is desirable that certain processing is executed in matching with the timing of image displaying, for avoiding the adverse effect on the image displaying and preventing the sensor from being affected by the content of the displayed image and the display drive itself, and in terms of easiness of the system configuration.

Figure 8B:
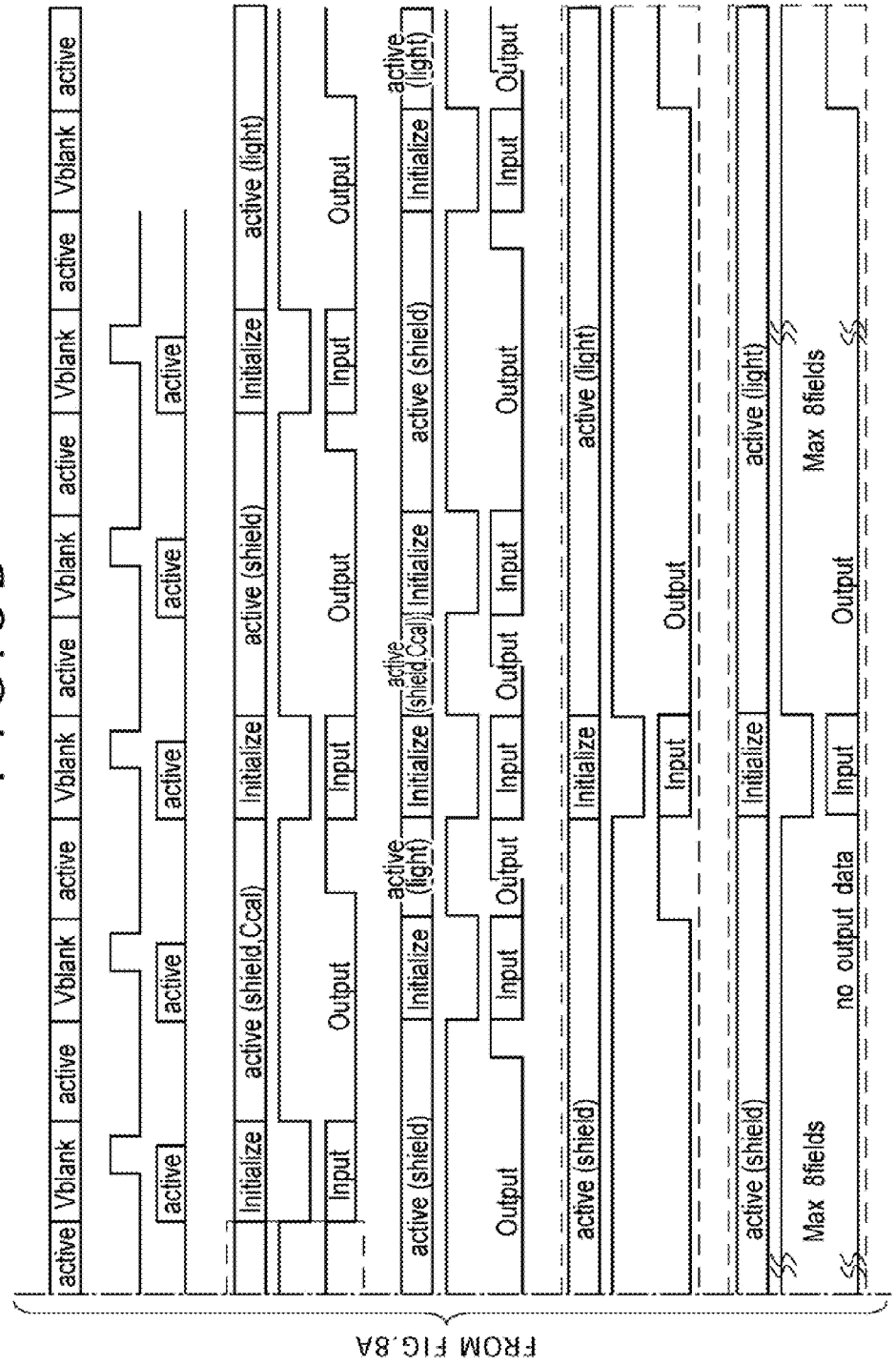
FIG. 8B is a diagram showing, following FIG. 8A, the timings of the image displaying on the display area and the detection by the photosensors.

FIGS. 8A and 8B are diagrams showing the timings of image displaying on the display area and detection by the photosensors. The image displaying on the display area is repeatedly carried out in such a way that a vertical blanking period and a display period are defined as one field. In the example shown in FIGS. 8A and 8B, four photosensors are provided and each photosensor repeatedly carries out the above-described steps from the first measurement step to the third measurement step. One cycle from the first measurement step to the third measurement step is indicated by the dashed-line frame in the diagrams. The initialization in each step is carried out in the vertical blanking period in the image displaying. This can avoid the influence on the image displaying and prevent the sensor from being adversely affected by the content of the displayed image and the display drive itself.

Furthermore, in each photosensor, the length of the detection period (active) differs depending on the light amount. This is because the comparator output value differs depending on the light-reception amount.

Figure 9:
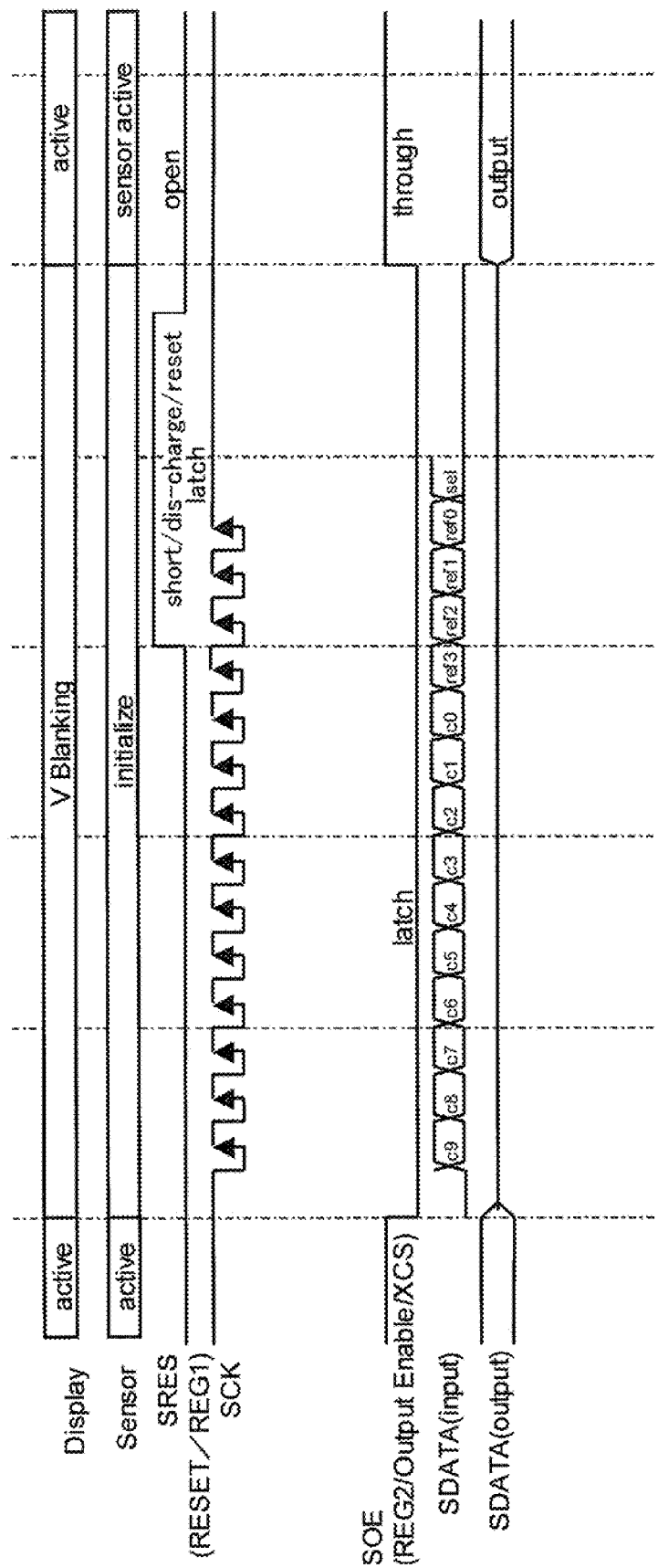
FIG. 9 is a diagram for explaining operation timings in an initialization period.

FIG. 9 is a diagram for explaining operation timings in the initialization period. As described above, each photosensor carries out the initialization in each measurement step within the vertical blanking period of the image displaying. Specifically, as the initialization, the reset of the memory of the difference calculation circuit and input of various kinds of data are carried out. The input data are information on which the first photosensor or the second photosensor is to be selected, information on the comparator reference value to be selected, and information on the additional capacitance to be selected.

Subsequently, the light amount (illuminance) of outside light of the display area is worked out by using the values detected by the respective photosensors, and the backlight control means shown in FIG. 1 controls the light amount of the backlight based on this light amount (illuminance).

<Electronic Apparatus>

Figure 10:
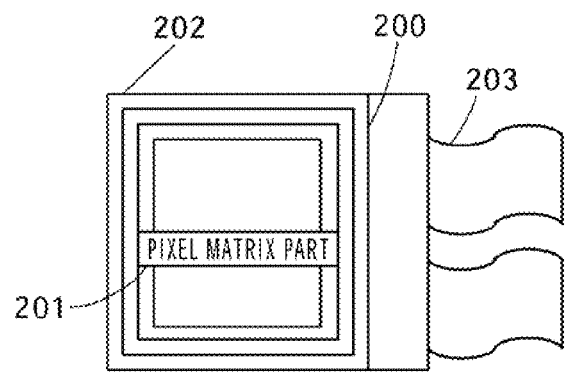
FIG. 10 is a schematic diagram showing an example of a flat module shape.

The display device according to the present embodiment encompasses one having a flat module shape like that shown in FIG. 10. For example, this display module is obtained as follows. A pixel array part in which pixels each including a liquid crystal element, a thin film transistor, a thin film capacitor, a light-receiving element, and so on are integrally formed into a matrix is provided on an insulating substrate 200. Furthermore, an adhesive is so disposed as to surround this pixel array part (pixel matrix part) 201, and a counter substrate 202 composed of glass or the like is bonded to the insulating substrate 200. This transparent counter substrate may be provided with a color filter, protective film, light-blocking film, and so on according to need. The display module may be provided with e.g. a FPC (flexible printed circuit) as a connector 203 for input/output of signals and so on to/from the pixel array part from/to the external.

The display device according to the above-described present embodiment can be applied to a display device that is included in electronic apparatus in any field and displays an image or video based on a video signal input to the electronic apparatus or produced in the electronic apparatus. Specifically, the display device can be applied to a display device in various kinds of electronic apparatus shown in FIGS. 11 to 15, such as a digital camera, notebook personal computer, portable terminal apparatus typified by a cellular phone, and video camera. Examples of electronic apparatus to which the present embodiment is applied will be described below.

Figure 11:
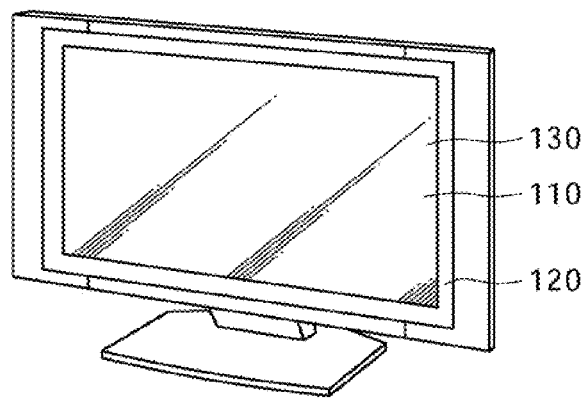
FIG. 11 is a perspective view showing a television to which the present embodiment is applied.

FIG. 11 is a perspective view showing a television to which the present embodiment is applied. The television according to the present application example includes a video display screen 110 composed of a front panel 120, a filter glass 130, and so on, and is fabricated by using the display device according to the present embodiment as the video display screen 110.

Figure 12:
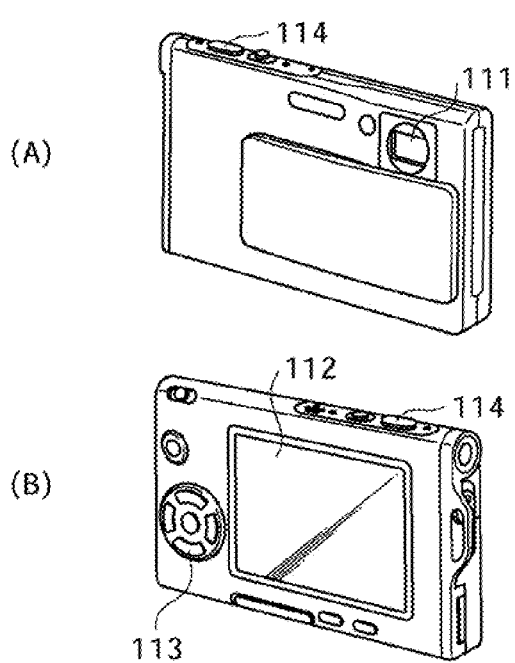
FIG. 12 is a perspective view showing a digital camera to which the present embodiment is applied.

FIG. 12 is a perspective view showing a digital camera to which the present embodiment is applied: (A) is a front-side perspective view and (B) is a backside perspective view. The digital camera according to the present application example includes a light emission unit 111 for flash, a display part 112, a menu switch 113, a shutter button 114, and so on, and is fabricated by using the display device according to the present embodiment as the display part 112.

Figure 13:
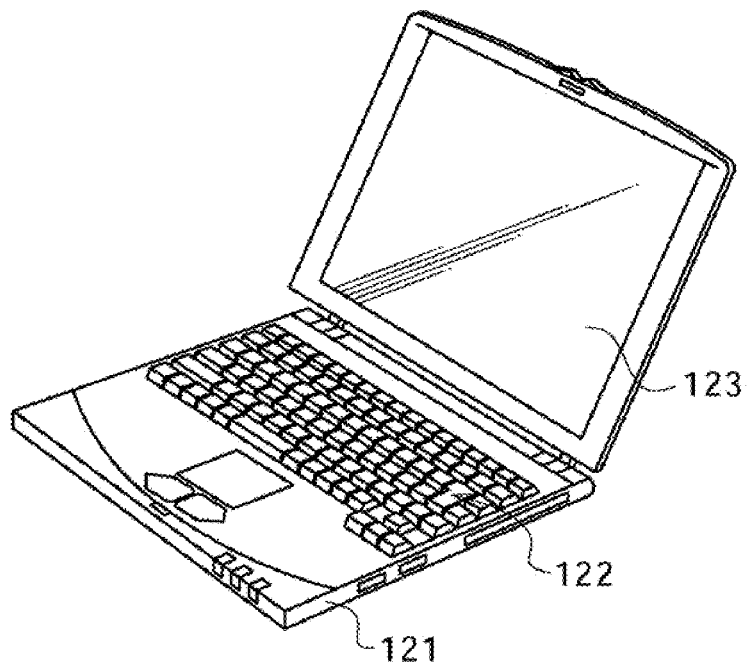
FIG. 13 is a perspective view showing a notebook personal computer to which the present embodiment is applied.

FIG. 13 is a perspective view showing a notebook personal computer to which the present embodiment is applied. The notebook personal computer according to the present application example includes, in a main body 121 thereof, a keyboard 122 operated in inputting of characters and so forth, a display part 123 for image displaying, and so on. This notebook personal computer is fabricated by using the display device according to the present embodiment as the display part 123.

Figure 14:
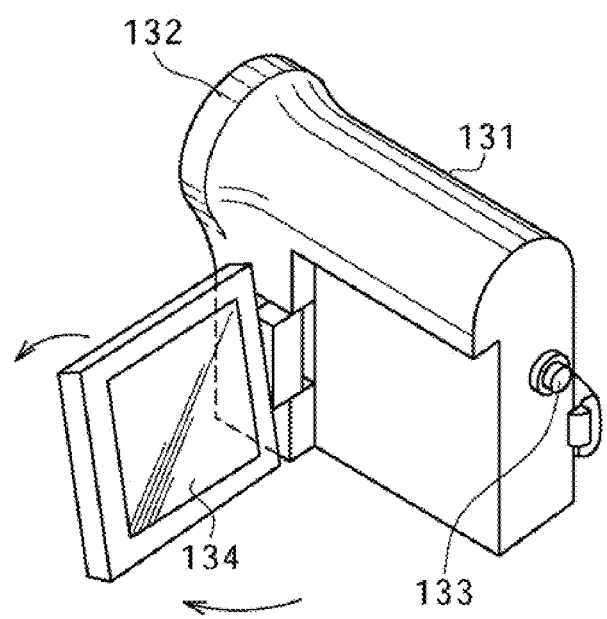
FIG. 14 is a perspective view showing a video camera to which the present embodiment is applied.

FIG. 14 is a perspective view showing a video camera to which the present embodiment is applied. The video camera according to the present application example includes a main body 131, a lens 132 that is disposed on the side face directed toward the front side and used to capture a subject image, a start/stop switch 133 used at the time of imaging, a display part 134, and so on. This video camera is fabricated by using the display device according to the present embodiment as the display part 134.

Figure 15:
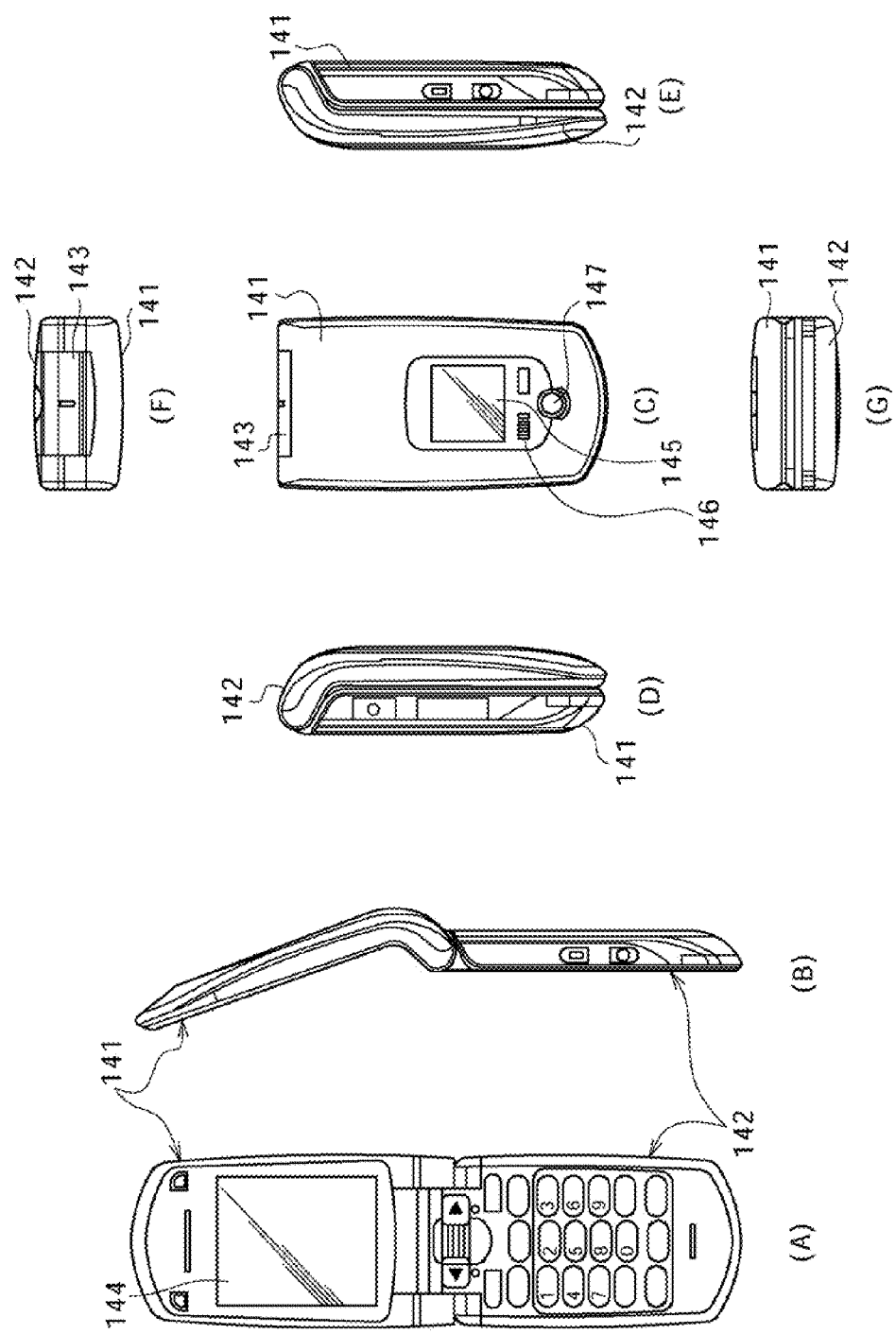
FIG. 15 is a diagram showing portable terminal apparatus to which the present embodiment is applied, specifically e.g. a cellular phone.

FIG. 15 is a diagram showing portable terminal apparatus to which the present embodiment is applied, specifically e.g. a cellular phone: (A) and (B) are front view and side view, respectively, of the opened state, and (C), (D), (E), (F), and (G) are front view, left-side view, right-side view, top view, and bottom view, respectively, of the closed state. The cellular phone according to the present application example includes an upper case 141, a lower case 142, a connection (hinge, in this example) 143, a display 144, a sub-display 145, a picture light 146, a camera 147, and so on. This cellular phone is fabricated by using the display device according to the present embodiment as the display 144 and the sub-display 145.

<Display-and-Imaging Device>

Figure 16:
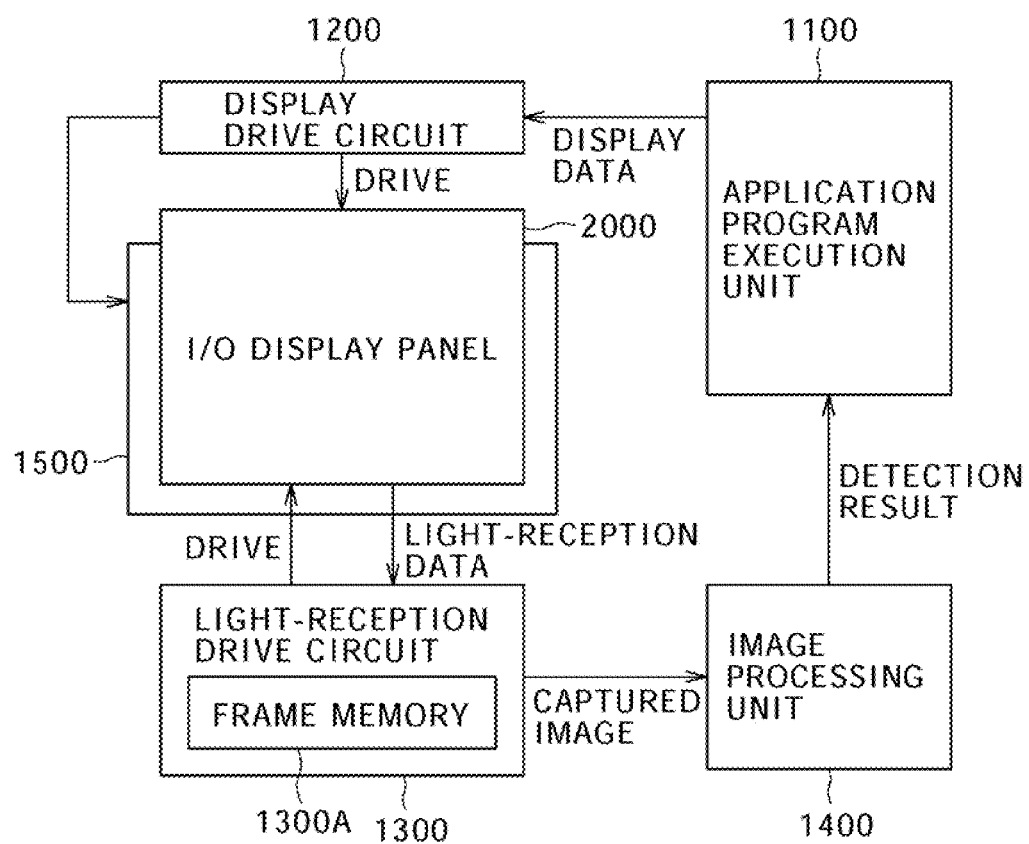
FIG. 16 is a block diagram showing the configuration of a display-and-imaging device according to the first embodiment.

The display device according to the present embodiment can be applied to the following display-and-imaging device. This display-and-imaging device can be applied to the above-described various kinds of electronic apparatus. FIG. 16 shows the entire configuration of the display-and-imaging device. This display-and-imaging device includes an I/O display panel 2000, a backlight 1500, a display drive circuit 1200, a light-reception drive circuit 1300, an image processing unit 1400, and an application program execution unit 1100.

The I/O display panel 2000 is formed of a liquid crystal panel (LCD (Liquid Crystal Display)) in which plural pixels are arranged in a matrix across the entire surface. The I/O display panel 2000 has a function (display function) to display a predetermined image such as graphics and characters based on display data through line-sequential operation, and has a function (imaging function) to capture the image of an object in contact with or in proximity to the I/O display panel 2000 as described later. The backlight 1500 is obtained by arranging e.g. plural light emitting diodes and serves as the light source of the I/O display panel 2000. The backlight 1500 carries out ON/OFF operation at high speed at predetermined timings in synchronization with the operation timings of the I/O display panel 2000 as described later.

The display drive circuit 1200 drives the I/O display panel 2000 (drives line-sequential operation) for displaying of an image based on display data on the I/O display panel 2000 (for display operation).

The light-reception drive circuit 1300 drives the I/O display panel 2000 (drives line-sequential operation) for acquisition of light-reception data by the I/O display panel 2000 (for imaging of an object). The light-reception data by the respective pixels are accumulated in a frame memory 1300A e.g. on a frame-by-frame basis and are output as a captured image to the image processing unit 1400.

The image processing unit 1400 executes predetermined image processing (arithmetic processing) based on the captured image output from the light-reception drive circuit 1300, and detects and acquires information on the object in contact with or in proximity to the I/O display panel 2000 (position coordinate data, data relating to the shape and the size of the object, and so forth). Details of the processing of the detection will be described in detail later.

The application program execution unit 1100 executes processing corresponding to predetermined application software based on the detection result by the image processing unit 1400. Examples of the processing include one for incorporating the position coordinates of the detected object into display data to thereby display the object on the I/O display panel 2000. The display data produced by the application program execution unit 1100 is supplied to the display drive circuit 1200.

Figure 17:
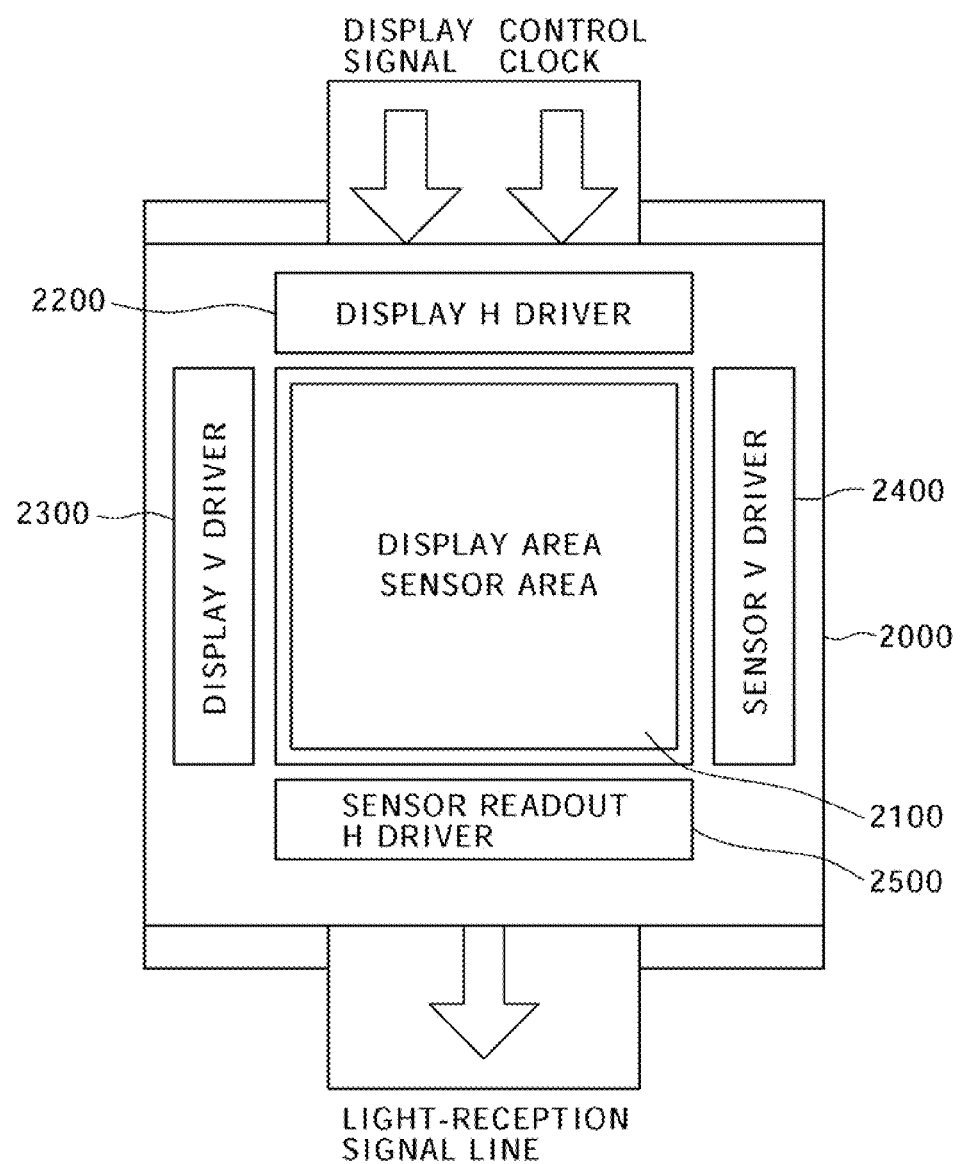
FIG. 17 is a block diagram showing a configuration example of an I/O display panel shown in FIG. 1.

A detailed configuration example of the I/O display panel 2000 will be described below with reference to FIG. 17. The I/O display panel 2000 includes a display area (sensor area) 2100, a display H driver 2200, a display V driver 2300, a sensor readout H driver 2500, and a sensor V driver 2400.

The display area (sensor area) 2100 is an area for outputting display light through modulation of light from the backlight 1500 and capturing the image of an object in contact with or in proximity to this area. In this area, liquid crystal elements as light-emitting elements (display elements) and light-receiving elements (imaging elements) to be described later are arranged in a matrix.

The display H driver 2200 line-sequentially drives the liquid crystal elements of the respective pixels in the display area 2100 together with the display V driver 2300, based on a display signal and a control clock for display driving, supplied from the display drive circuit 1200.

The sensor readout H driver 2500 line-sequentially drives the light-receiving elements of the respective pixels in the sensor area 2100 together with the sensor V driver 2400, to thereby acquire a light-reception signal.

Figure 18:
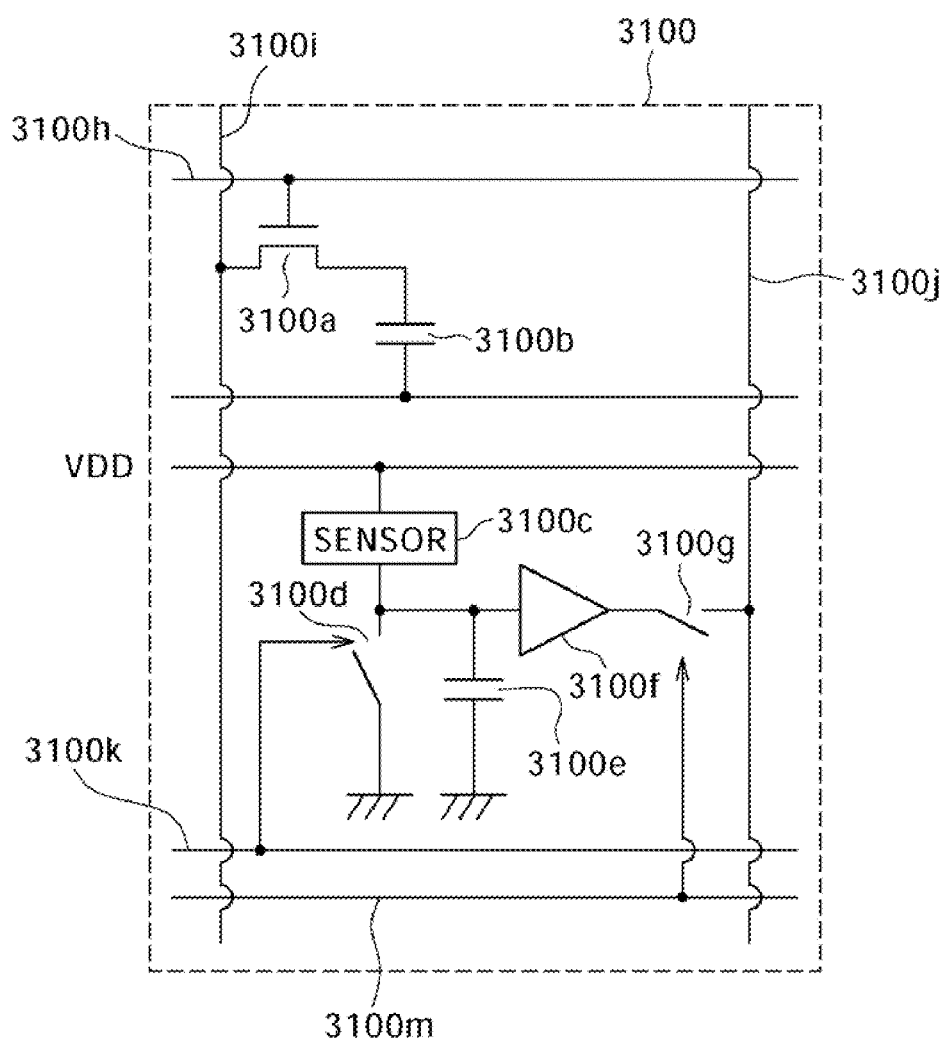
FIG. 18 is a circuit diagram showing a configuration example of each pixel.

A detailed configuration example of each pixel in the display area 2100 will be described below with reference to FIG. 18. A pixel 3100 shown in FIG. 18 includes a liquid crystal element as a display element and a light-receiving element.

Specifically, on the display element side, a switching element 3100*a* formed of a thin film transistor (TFT) or the like is disposed at the intersection of a gate electrode 3100*h* extending along the horizontal direction and a drain electrode 3100*i* extending along the vertical direction. A pixel electrode 3100*b* including a liquid crystal is disposed between the switching element 3100*a* and a counter electrode. The switching element 3100*a* carries out ON/OFF operation based on a drive signal supplied via the gate electrode 3100*h*. When the switching element 3100*a* is in the on-state, a pixel voltage is applied to the pixel electrode 3100*b* based on a display signal supplied via the drain electrode 3100*i*, so that the display state is set.

On the other hand, on the light-receiving element side adjacent to the display element, a light-reception sensor 3100c formed of e.g. a photodiode is disposed and a supply voltage VDD is provided thereto. A reset switch 3100d and a capacitor 3100e are connected to the light-reception sensor 3100c. Charges dependent on the light-reception amount are accumulated in the capacitor 3100e, and charges are reset by the reset switch 3100d. At the turn-on timing of a readout switch 3100g, the accumulated charges are supplied via a buffer amplifier 3100f to a signal output electrode 3100j and output to the external. The ON/OFF operation of the reset switch 3100d is controlled by a signal supplied from a reset electrode 3100k. The ON/OFF operation of the readout switch 3100g is controlled by a signal supplied from a readout control electrode 3100k.

Figure 19:
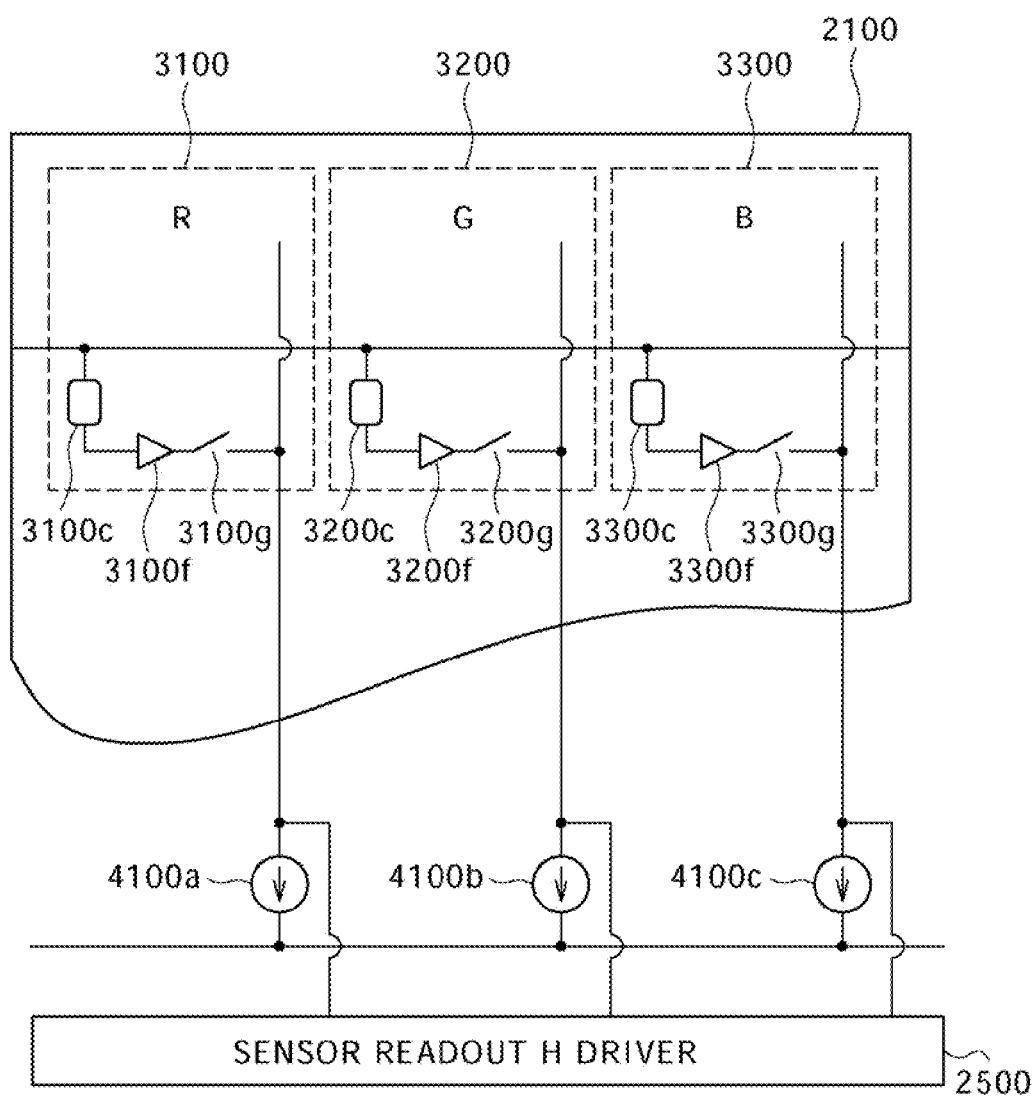
FIG. 19 is a circuit diagram for explaining the connection relationship between the respective pixels and a sensor readout H driver.

With reference to FIG. 19, the connection relationship between the respective pixels in the display area 2100 and the sensor readout H driver 2500 will be described below. In this display area 2100, a pixel 3100 for red (R), a pixel 3200 for green (G), and a pixel 3300 for blue (B) are arranged.

Charges accumulated in capacitors connected to the light-reception sensors 3100c, 3200c, and 3300c in the respective pixels are amplified by the buffer amplifiers 3100f, 3200f, and 3300f, respectively, and are supplied via signal output electrodes to the sensor readout H driver 2500 at the turn-on timings of the readout switches 3100g, 3200g, and 3300g, respectively. Constant current sources 4100a, 4100b, and 4100c are connected to the respective signal output electrodes, and thus signals dependent on the light-reception amounts are detected by the sensor readout H driver 2500 with high sensitivity.

The operation of the display-and-imaging device will be described in detail below.

Initially, the basic operation of this display-and-imaging device, i.e. display operation and object imaging operation in a pixel, will be described below.

In this display-and-imaging device, a drive signal for displaying is produced in the display drive circuit 1200 based on display data supplied from the application program execution unit 1100, and line-sequential display driving of the I/O display panel 2000 is carried out by this drive signal, so that an image is displayed. At this time, the backlight 1500 is also driven by the display drive circuit 1200, so that lighting and lighting-stop operation in synchronization with the I/O display panel 2000 is carried out.

Figure 20:
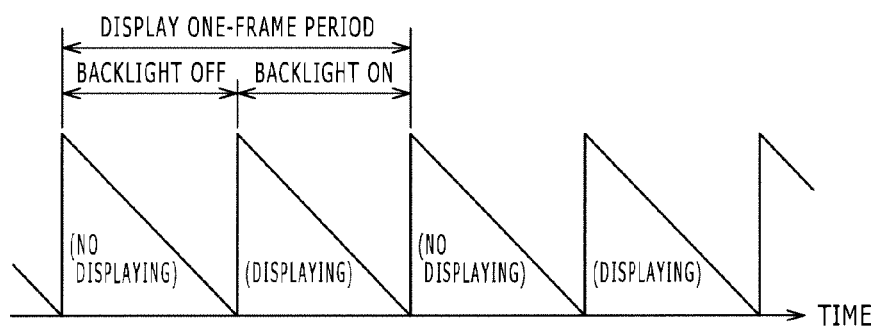
FIG. 20 is a timing diagram for explaining the relationship between the on-/off-state of a backlight and the display state.
Figure 21:
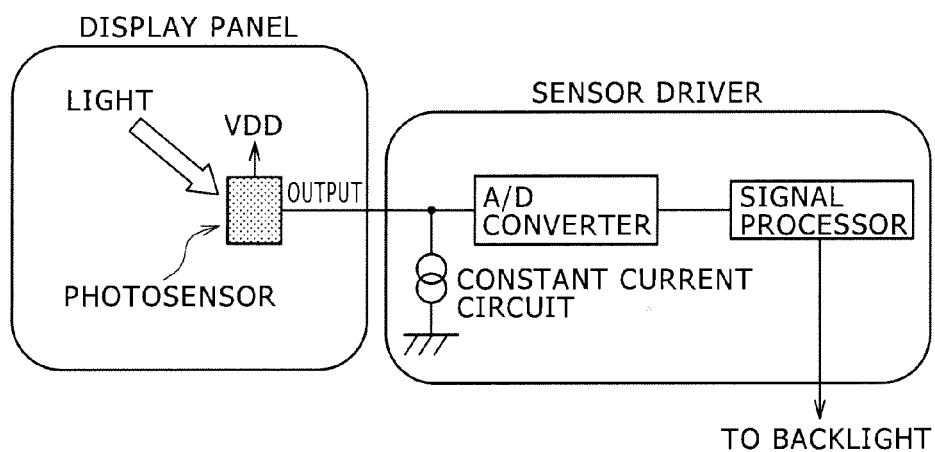
FIG. 21 is a diagram for explaining a conventional example (first).

With reference to FIG. 20, the relationship between the on-/off-state of the backlight 1500 and the display state of the I/O display panel 2000 will be described below.

First, in the case of image displaying with a frame cycle of e.g. 1/60 seconds, the backlight 1500 stops lighting (is in the off-state) and thus displaying is not carried out during the former period of each frame period (for 1/120 seconds). On the other hand, during the latter period of each frame period, the backlight 1500 carries out lighting (is in the on-state) and display signals are supplied to the respective pixels, so that an image corresponding to this frame period is displayed.

As above, the former period of each frame period is a light-absent period during which display light is not output from the I/O display panel 2000. On the other hand, the latter period of each frame period is a light-present period during which display light is output from the I/O display panel 2000.

When there is an object (such as a fingertip) in contact with or in proximity to the I/O display panel 2000, the image of the object is captured by the light-receiving elements of the respective pixels in the I/O display panel 2000 through line-sequential light-reception driving by the light-reception drive circuit 1300, and light-reception signals from the respective light-receiving elements are supplied to the light-reception drive circuit 1300. The light-reception signals of the pixels corresponding to one frame are accumulated in the light-reception drive circuit 1300 and are output as a captured image to the image processing unit 1400.

The image processing unit 1400 executes predetermined image processing (arithmetic processing) to be described below based on this captured image, so that information on the object in contact with or in proximity to the I/O display panel 2000 (position coordinate data, data relating to the shape and the size of the object, and so forth) is detected.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A display device comprising:
 a first detection element that detects a light amount of outside light;
 a second detection element that detects a dark current arising when the outside light is blocked;
 selection means for selecting either one of the first detection element and the second detection element;
 a comparator that compares an output of the first detection element and the second detection element selected by the selection means with a predetermined reference value time divisionally, where a first amount of time is measured from a detection start of the first detection element to a time at which a detection value of the first detection element exceeds the predetermined reference value and said first amount of time is stored as a first comparison result, and a second amount of time is measured from a detection start of the second detection element to a time at which a detection value of the second detection element exceeds the predetermined reference value and said second amount of time is stored as a second comparison result; and
 control means for calculating a difference between the first comparison result obtained by the comparator when the first detection element is selected by the selection means and the second comparison result obtained by the comparator when the second detection element is selected, and controlling an amount of light supplied to the display area depending on a calculation result.

2. The display device according to claim 1, further comprising
 reference value switch means for switching the predetermined reference value input to the comparator between the cases when the first detection element is selected by the selection means and when the second detection element is selected.

3. The display device according to claim 1, further comprising
 additional capacitance switch means for switching additional capacitance connected in common to the first and second detection elements between the cases when the first detection element is selected by the selection means and when the second detection element is selected.

4. A display control method of a display device including a first detection element that detects a light amount of outside light and a second detection element that detects a dark current arising when the outside light is blocked, the method comprising:

a step of detecting a current dependent on an ambient light amount by the first detection element and calculating a first comparison result obtained when the outside light is received through comparison with a predetermined reference value, where a first amount of time is measured from a detection start of the first detection element to a time at which a detection value of the first detection element exceeds the predetermined reference value and said first amount of time is stored as the first comparison result;

a step of detecting the dark current arising when the outside light is blocked by the second detection element and calculating a second comparison result obtained when the outside light is blocked through comparison with a predetermined reference value, where a second amount of time is measured from a detection start of the second detection element to a time at which a detection value of the second detection element exceeds the predetermined reference value and said second amount of time is stored as the second comparison result; and a step of calculating a difference between the first comparison result obtained when the outside light is received and the second comparison result obtained when the outside light is blocked, and controlling an amount of light supplied to the display area depending on a calculation result.

5. The display control method according to claim 4, wherein a predetermined reference value applied to a calculation of the respective second and first comparison results is switched between the cases when current is detected by the second detection element and when current is detected by the first detection element.

6. The display control method according to claim 4, wherein additional capacitance connected in common to the first and second detection elements is switched between the cases when current is detected by the second detection element and when current is detected by the first detection element.

7. The display control method according to claim 6, wherein the additional capacitance is set depending on an ambient temperature of the display area.

8. An electronic apparatus comprising a display device provided in a case, the display device including:

a first detection element that detects a light amount of outside light;

a second detection element that detects a dark current arising when the outside light is blocked;

selection means for selecting either one of the first detection element and the second detection element;

a comparator that compares an output of the first detection element and the second detection element selected by the selection means with a predetermined reference value time divisionally, where a first amount of time is measured from a detection start of the first detection element to a time at which a detection value of the first detection element exceeds the predetermined reference value and said first amount of time is stored as a first comparison result, and a second amount of time is measured from a detection start of the second detection element to a time at which a detection value of the second detection element exceeds the predetermined reference value and said second amount of time is stored as a second comparison result; and control means for calculating a difference between the first comparison result obtained by the comparator when the first detection element is selected by the selection means and the second comparison result obtained by the comparator when the second detection element is selected, and controlling an amount of light supplied to the display area depending on a calculation result.

* * * * *